United States Patent [19]

Figge et al.

[11] Patent Number: 5,388,399
[45] Date of Patent: Feb. 14, 1995

[54] ROCKET MOTOR HAVING UNITARY CASE, INSULATION AND PROPELLANT

[75] Inventors: Irving E. Figge; James D. Martin, both of Manassas, Va.

[73] Assignee: Atlantic Research Corporation, Vienna, Va.

[21] Appl. No.: 850,975

[22] Filed: Mar. 11, 1992

[51] Int. Cl.⁶ .......................... F02K 9/00; F02K 9/08; F02K 9/70; F02K 9/72
[52] U.S. Cl. ........................... 60/253; 60/255; 60/909; 244/62; 29/890.01
[58] Field of Search ................. 60/253, 255, 909; 244/62; 29/890.01

[56] References Cited

U.S. PATENT DOCUMENTS

| | | | |
|---|---|---|---|
| 3,811,358 | 5/1974 | Morse | 102/101 |
| 4,118,928 | 10/1978 | Lyles | 60/255 |
| 4,120,153 | 10/1978 | Schaffling | 60/255 |
| 4,131,051 | 12/1978 | Schaffling | 86/1 R |
| 4,764,316 | 8/1988 | Brown et al. | 264/3.1 |
| 4,915,754 | 4/1990 | Hightower, Jr. et al. | 149/19.4 |
| 5,038,561 | 8/1991 | Chase | 60/254 |

*Primary Examiner*—J. Woodrow Eldred
*Attorney, Agent, or Firm*—Frank P. Presta

[57] ABSTRACT

An improved rocket motor and a method for its manufacture are characterized by the provision of a thermoplastic elastomer binder in the outer casing, the insulation layer, and the propellant. When the motor is heated to the melting point of the binder, the bondlines between the propellant and insulation and between the insulation and casing are simultaneously fused to form a unitary motor structure.

9 Claims, No Drawings

ROCKET MOTOR HAVING UNITARY CASE, INSULATION AND PROPELLANT

BACKGROUND OF THE INVENTION

The present invention relates to an improved rocket motor in which the case, insulation, and propellant are all based on thermoplastic elastomer binders. With such a structure, bondlines between the components are simultaneously fused during curing.

BRIEF DESCRIPTION OF THE PRIOR ART

Conventional rocket motors typically comprise a cylindrical casing and a solid propellant arranged in the casing. Because of the high temperatures generated by combustion of the propellant, the casing, which is typically formed of a composite material, has a tendency to fail before combustion of the propellant is completed. Accordingly, it is necessary to provide an insulation liner between the propellant and the casing as shown in the Chase et al U.S. Pat. No. 3,973,397. Because of the incompatibilities between the insulation and the propellant and between the insulation and the casing, it is difficult to provide an adequate bond therebetween. Accordingly, various types of insulation materials or bonding liners have been used, unfortunately with limited success.

In addition to unreliable bondlines between the components of prior rocket motors, a further drawback is the time required to manufacture the motors. Because of the materials used, a multi-day curing period is required for the formation of the case, insulation, and propellant. Although the insulation and case may be manufactured and cured together, separate curing of the propellant is required. These separate cure steps increase the time and costs of manufacture.

The present invention was developed in order to overcome these and other drawbacks of the prior art by providing an improved rocket motor structure which eliminates the need for separate cure steps and insulation liners by providing fused bondlines between the components of the motor.

SUMMARY OF THE INVENTION

Accordingly, it is a primary object of the present invention to provide an improved rocket motor and a method for its manufacture. The motor includes an outer cylindrical casing formed of composite material and containing a thermoplastic elastomer binder. A wound layer of insulation is provided adjacent the inner surface of the casing, the insulation layer also containing a thermoplastic elastomer binder. A solid propellant containing a thermoplastic elastomer binder is arranged within the insulation layer. The assembled motor is heated to the melting temperature of the binders to simultaneously fuse the bond interfaces between the propellant, insulation, and casing, thereby to form a unitary motor structure.

According to a more specific object of the invention, the same thermoplastic elastomer binder is provided in the casing, insulation, and propellant. Suitable binders include a polybutadiene/polystyrene block copolymer or fiberglass-reinforced udel polysulfone.

DETAILED DESCRIPTION

The improved rocket motor according to the invention comprises an outer cylindrical case formed of a composite material containing graphite fibers and a thermoplastic elastomer resin or binder. Arranged within the case is an insulation layer adjacent the inner surface of the case. The insulation layer also has a cylindrical configuration and contains a thermoplastic elastomer binder.

A propellant is poured into the hollow area of the rocket motor defined by the cylindrical insulation layer. A thermoplastic elastomer binder is provided in the propellant.

Although separate thermoplastic elastomer binders may be used in the case, insulation, and propellant, it is preferred that the same binder be used in all three components. If separate binders are used, it is important that they be compatible and have generally the same melting point.

Once assembled, the rocket motor is cured by heating the motor to a temperature at or above the melting point of the binder. The bondlines between the propellant and the insulation and between the insulation and the casing are simultaneously fused to create a unitary motor structure.

Any number of suitable and compatible thermoplastic elastomer binders may be incorporated into the rocket motor components in accordance with the invention. One such binder comprises a polybutadiene/polystyrene block copolymer. A family of such copolymers are marketed under the trademark KRATON ®. Another suitable binder comprises fiberglass-reinforced udel polysulfone.

In accordance with the method for manufacturing the improved rocket motors of the invention, the insulation layer is initially wound into a cylindrical configuration, following which the outer case is wound about the insulation layer. The propellant is poured into the central chamber of this structure. With a thermoplastic elastomer binder being provided in all three components of the motor, the motor is heated or cured at a temperature above the melting temperature of the binder to fuse the bondlines between the components, thereby to form a unitary motor structure.

The insulation layer was developed and characterized in terms of its response in a torch test. The formulation of a suitable insulation material is as follows:

|  | % weight |
|---|---|
| thermoplastic elastomer binder | 57.16 |
| silene 732 D | 7.45 |
| alumina trihydrate | 13.04 |
| firebrake zinc borate | 5.59 |
| polybenzimidazole fiber, ⅛" | 5.59 |
| polybenzimidazole fiber, ¼" | 11.17 |

Such an insulation has a torch plastic elastomer binder, the insulation has a torch time of 78 seconds which is suitable for propellant combustion.

The cylindrical casing is based on a graphite/fiber with a thermoplastic resin system. Test casings or cylinders were fabricated and hydroburst at pressures exceeding 1500 psi. The cylinders are reprocessible to remove wrinkles. When wound about the insulation layer and heated, case-to-insulation bonds of 3.9 pli were achieved. Moreover, test motors manufactured with an inert propellant containing a thermoplastic elastomer binder were heated to fuse the propellant to the insulation which in turn was fused to the case. Superior bond properties therebetween were achieved.

In accordance with the invention low-cost, high reliability rocket motors are provided. As compared with prior rocket motors, only a single cure step is required, resulting in a significant reduction in the time required to manufacture the motors. Moreover, undesirable bondlines between the components of the motor are eliminated.

What is claimed is:

1. A rocket motor, including
   (a) an outer hollow casing containing a thermoplastic elastomer binder;
   (b) an insulation layer arranged adjacent an inner surface of said casing, said insulation layer containing a thermoplastic elastomer binder; and
   (c) a propellant containing a thermoplastic elastomer binder arranged within said insulation layer, whereby when the motor is heated to the melting temperature of said binders, fused bond interfaces between said propellant, insulation, and casing are simultaneously developed.

2. A rocket motor as defined in claim 1, wherein the same thermoplastic elastomer binder is provided in said casing, said insulation layer, and said propellant.

3. A rocket motor as defined in claim 2, wherein said casing comprises a graphite fiber material.

4. A rocket motor as defined in claim 3, wherein said thermoplastic elastomer binder comprises fiberglass-reinforced polyethersulfone.

5. A rocket motor as defined in claim 3, wherein said thermoplastic elastomer binder comprises a polybutadiene/polystyrene block copolymer.

6. A method for manufacturing a rocket motor, comprising the steps of
   (a) winding an insulation layer containing a thermoplastic elastomer binder into a cylindrical configuration;
   (b) winding an outer casing about said insulation layer, said casing containing a thermoplastic elastomer binder;
   (c) injecting a propellant into the interior of said cylindrical insulation layer, said propellant containing a thermoplastic elastomer binder to form the motor; and
   (d) heating said motor to the melting point of said thermoplastic elastomer binders to simultaneously fuse bond interfaces between said propellant and said insulation layer and said insulation layer and said casing.

7. A method for manufacturing a rocket motor as defined in claim 6, wherein the same thermoplastic elastomer binder is provided in said casing, insulation layer, and propellant.

8. A method for manufacturing a rocket motor as defined in claim 6, wherein said thermoplastic elastomer binder comprises fiberglass-reinforced polyethersulfone.

9. A method for manufacturing a rocket motor as defined in claim 6, wherein said thermoplastic elastomer binder comprises a polybutadiene/polystyrene block copolymer.

* * * * *